(12) United States Patent
Chang et al.

(10) Patent No.: US 8,130,263 B2
(45) Date of Patent: Mar. 6, 2012

(54) HEAD-MOUNTED VISUAL DISPLAY DEVICE FOR LOW-VISION AID AND ITS SYSTEM

(75) Inventors: Yin Chang, Taipei (TW); Yen-Liung Lai, Kaohsiung (TW); Ji-Min Li, Taipei (TW); Yu-Wei Du, Tainan (TW)

(73) Assignee: National Yang-Ming University, Taipei (TW)

( * ) Notice: Subject to any disclaimer, the term of this patent is extended or adjusted under 35 U.S.C. 154(b) by 185 days.

(21) Appl. No.: 12/769,063

(22) Filed: Apr. 28, 2010

(65) Prior Publication Data

US 2011/0134318 A1   Jun. 9, 2011

(30) Foreign Application Priority Data

Dec. 3, 2009 (TW) .............................. 98141296 A

(51) Int. Cl.
 *H04N 9/47* (2006.01)
 *G02B 27/14* (2006.01)
(52) U.S. Cl. ............................ 348/62; 348/53; 359/630
(58) Field of Classification Search .................. 348/53, 348/62, 455; 345/7, 8; 359/630
See application file for complete search history.

(56) References Cited

U.S. PATENT DOCUMENTS

2009/0102746 A1* 4/2009 Fisher et al. .................... 345/8
2010/0103077 A1* 4/2010 Sugiyama et al. ............... 345/8

OTHER PUBLICATIONS

Peli, "Limitations of Image Enhancement for the Visually Impaired", Jan. 1992, Optometry & Vision Science, vol. 69, pp. 15-24.*

* cited by examiner

*Primary Examiner* — Yemane Mesfin
(74) *Attorney, Agent, or Firm* — Muncy, Geissler, Olds & Lowe, PLLC

(57) ABSTRACT

A head-mounted visual display device for low-vision aid, which features 2 models, they are analog signal model and digital signal model. Said analog device contains at least an analog video extractor, a video decoder, an ITU-R.656 decoder, a de-interlacing unit, an image processor, two YCbCr to RGB converter, two color enhancement units, two video D/A converter, a head mounted display, a signal voltage controller and a wireless communication module. Said digital device consists of a digital video signal extractor/capturer, a RGB to YCbCr converter, an image processor, two YCbCr to RGB converter, two color enforcement units, a head-mounted display, a signal voltage controller and a wireless communication module.

10 Claims, 3 Drawing Sheets

HEAD-MOUNTED VISUAL DISPLAY DEVICE FOR LOW-VISION AID AND ITS SYSTEM

FIELD OF THE INVENTION

The present invention generally relates to a head mounted visual display device and system for low-vision aid and more particularly to a head mounted visual display device and system for low-vision aid that processes separately the black and white elements and color elements of video signals.

BACKGROUND OF THE INVENTION

The definition of visual impairment is conventionally based on the visual acuity and vision. Visual impairment means that the visual acuity after correction is below 0.3 (6/20). The legally blindness means that, after correction, the visual acuity is still lower than 20/200 or the visual field is less than 20 degree. Usually, even when one is classified as blind, he still may have slight capacity of distinguishing light and dark. Low vision is used to describe those who don't have complete vision however have better visual acuity than total blind. According experts, "low vision" is defined as having quite a visual impairment however having quite a little of useful residual vision. The way one uses visual aids to enhance the effective use of his residual vision and the condition one's visual impairment are very positively relevant. Such as the age of onset, the visual impairment occurs at different ages will result in different capacity of learning, thinking pattern concerning concrete and abstract objects, skills, concepts etc. Some diseases also cause visual lesions. For example, the loss of central vision caused by macular degeneration will affect one's reading ability while the loss of peripheral vision caused by retinitis pigmentosa or glaucoma will affect one's moving ability.

The main function of current low-vision aid system, such as closed-circuit television (CCTV), magnifying glass, telescope, the magnification software for computers, etc. is to enlarge fonts or images, is generally used in static environment However, once the fonts or images are magnified, the visual field is narrowed. As to color images, there is no enhancement in luminance contrast. The current low-vision aiding tools are thus only suitable for static indoor use and cannot help low-vision people to increase indoor or outdoor moving ability.

Hence, how to enhance the visually distinguishing ability for low-vision people is one of the main tasks that the industry tries to accomplish.

SUMMARY

Summary of the Invention

The main objective of the present invention is to provide a head mounted visual display device as low-vision aid that processes separately the black and white elements and color elements of video signals in order to improve the visually distinguishing ability for low-vision people. The secondary objective of the present invention is to provide a head mounted visual display device as low-vision aid that can be used by either analog or digital extractors.

To achieve the above objectives, the present invention provides a head mounted visual display device as low-vision aid that can be categorized into analog signal model and digital signal model.

The NTSC (National Television System Committee) formatted analog signal model of head mounted visual display device as low-vision aid includes at least: an analog video extractor that captures analog video signal of video data; a video decoder that receives the analog video signal from the video extractor and extract the analog video signal from the video; a ITU-R.656 decoder that receives the analog video signal extracted from the video decoder and converts the analog video signal into digital video signal; a de-interlacing unit that receives the digital video signal converted by the ITU-R.656 decoder and deinterlace the digital video signal so that the signal will appear in sequence; a wireless communication unit that provides digital signal of information on internet using wireless internet access; a video processor that receives the digital video signal of information on internet that is provided by the wireless communication unit and is deinterlaced by the deinterlacing unit, filters the received digital video signal into an enhanced digital video signal and then set the bidirectional output of the digital video signal; two YCbCr to RGB converters that simultaneously receive the two digital video signals of the bidirectional output from the video processor and convert the YCbCr signal from the two digital video signal into RGB signal; two color enhancement units that simultaneously receive the RGB digital video signals converted by the two YCbCr to RGB converters and enhance the color contrast of the digital signals; two digital/analog (D/A) converters that simultaneously receive the two color-contrast-enhanced digital video signals from the two color enhancement units and convert to digital or analog according to the display units; a head mounted display unit that simultaneously receives the two video signals converted by the two D/A converters and provides the video of the two video signals simultaneously; a signal voltage controller with bi-directional electrical connection to the video decoder provides the signal control bus ($I^2C$, Inter-Integrated Circuit), which is the circuit system bus, and the detection of voltage, when a low-voltage is detected, a alerting signal is sent to the head mounted display unit and the circuit system.

The digital signal model of head mounted visual display device for low-vision aid includes at least: a digital video extractor that captures digital video signal of video data; a RGB to YCbCr converter that receives the digital video signal captured by the video extractor and converts the RGB signal of the digital video into a YCbCr signal; a wireless communication unit that provides digital signal of information on internet using wireless internet access; a video processor that receives the digital video signal of information on internet that is provided by the wireless communication unit and the YCbCr video signal from the RGB to YCbCR converter, filters the received digital video signal into an enhanced digital video signal and then sets the bidirectional output of the digital video signal; two YCbCr to RGB converters that simultaneously receive the two digital video signals of the bidirectional output from the video processor and convert the YCbCr signal from the two digital video signal into RGB signal; two color enhancement units that simultaneously receive the RGB digital video signals converted by the two YCbCr to RGB converters and enhance the color contrast of the digital signals; two digital/analog (D/A) converters that simultaneously receive the two color-contrast-enhanced digital video signal from the two color enhancement units and convert to digital or analog according to the display unit; a head mounted display unit that simultaneously receives the two video signals converted by the two D/A converters and provides the video of the two video signals simultaneously; a signal voltage controller with bi-directional electrical connection to the RGB to YCbCr converters provides the signal control bus ($I^2C$, Inter-Integrated Circuit), which is the circuit system bus, and the detection of voltage, when a low-voltage is detected, a alerting signal is sent to the head mounted display unit and the circuit system.

To achieve these objectives, the present invention disclosed a head mounted visual display device for low-vision aid that processes the black and white elements and color elements of video separately.

The detailed features and methods of the present invention are described thoroughly below with relevant figures.

DETAILED DESCRIPTION OF THE INVENTION

As shown in FIG. 1, the illustrative circuit diagram of the analog model of the present invention of a head mounted low-vision aid device.

The analog signal model of head mounted visual display device (1) for low-vision aid includes at least: an analog video extractor (11) that captures analog video signal of video data; a video decoder (12) that receives the analog video signal from the video extractor (11) and extract the analog video signal from the video; a ITU-R.656 decoder (13) that receives the analog video signal extracted from the video decoder (12) and converts the analog video signal into digital video signal; a de-interlacing unit (14) that receives the digital video signal converted by the ITU-R.656 decoder (13) and deinterlace the digital video signal so that the signal will appear in sequence; a wireless communication unit (15) that provides digital signals (including videos) of information on internet using wireless internet access; a video processor (16) that receives the RF (radio frequency) digital signal of information on internet that is provided by the wireless communication unit (15) and filters the received digital signal into an enhanced digital image signal and then set two outputs for the digital image signal; two YCbCr to RGB converters (17) that simultaneously receive the two digital image signals of the two outputs from the image processor (16) and convert the YCbCr signal from the two digital image signals into RGB signals; two color enhancement units (18) that simultaneously receive the RGB digital image signals converted by the two YCbCr to RGB converters (17) and enhance the color contrast of the digital signals; two digital/analog (D/A) converters (19) that simultaneously receive the two color-contrast-enhanced digital image signals from the two color enhancement units (18) and convert to digital or analog signals according to the display unit; if the display unit has analog input then the head mounted display unit (20) that simultaneously receives the two image signals converted by the two D/A converters (19) and provides the two analog video signals simultaneously; if the display unit has digital input then the head mounted display unit (20) that simultaneously receives the two image signals from color enhancement units (18); a signal voltage controller (21) with bi-directional electrical connection to the video decoder (12) provides the signal control (I²C, Inter-Integrated Circuit), which is the circuit system bus; and the detection of voltage, when a low-voltage is detected, an alerting signal is sent to the head mounted display unit (20) and the circuit system.

The video processor (16) includes at least: a filter (161) that filters the digital video signals into enhanced digital video signals; a shifter (162) that processes left shift, left rotation, right shift and right rotation on the enhanced digital video signal and provides the bidirectional output of the digital video signal.

The algorithm for color saturation enhancement of the two color enhancement units (17) for a single pixel is described by using the formula in below:
1. The averaged sum of R, G, B values is taken as the brightness Y of that pixel.

$$Y = \frac{(R+G+B)}{3}$$

2. The maximum magnification zoom is calculated as the minimum of the magnification zoom of the three colors $$Mul = \min\left(\sqrt{\frac{255-R}{|R-Y|}}, \sqrt{\frac{255-G}{|G-Y|}}, \sqrt{\frac{255-B}{|B-Y|}}\right)$$

3. Adjust the coefficient between 0 and 1.

$CQ=(0\sim1)$

4. RGB converting formula $Rnew=(1+CQ*Mul)*(R-Y)+Y$ $Gnew=(1+CQ*Mul)*(G-Y)+Y$ $Bnew=(1+CQ*Mul)*(B-Y)+Y$ The head mounted display unit (20) includes at least: two micro-displays (201) that simultaneously receive the image signals converted by the D/A converters and present to the two micro-displays (201).

The signal voltage controller (21) includes at least: a voltage detector (211) that detects the voltage value and generates reference voltage data for voltage value analysis; a bidirectional serial communication controller (212) that provides signal control bus (I²C Inter-Integrated Circuit), which is the circuit system bus; a low voltage alerter (213) that a warning signal is sent to head mounted display (20) and the circuit system upon receiving low voltage signal from voltage detector (211).

As shown in FIG. 2, it illustrates the circuit diagram of the digital model of the present invention of a head mounted low-vision aid device. The digital signal model of head mounted visual display device (3) for low-vision aid includes at least: a digital video extractor (31) that captures digital video signal of video data; a RGB to YCbCr converter (32) that receives the digital video signal captured by the video extractor (31) and converts the RGB signal of the digital video into YCbCr signal; a wireless communication unit (33) that provides digital information on internet using wireless internet access; a video processor (34) that receives the digital information on internet that is provided by the wireless communication unit (33) and the YCbCr video signal from the RGB to YCbCR converter (32), filters the received digital video signal into an enhanced digital video signal and then sets the bidirectional output of the digital video signal; two YCbCr to RGB converters (35) that simultaneously receive the two digital video signals of the bidirectional output from the video processor (34) and convert the YCbCr signal from the two digital video signal into RGB signal; two color enhancement units (36) that simultaneously receive the RGB digital video signals converted by the two YCbCr to RGB converters (35) and enhance the color contrast of the digital signals; two digital/analog (D/A) converters (37) that simultaneously receive the two color-contrast-enhanced digital video signal from the two color enhancement units (36) and convert to digital or analog according to the display unit; a head mounted display unit (38) that simultaneously receives the two video signals converted by the two D/A converters (37) and simultaneously provides the display unit of the two video signals; a signal voltage controller (39) with bi-directional electrical connection to the RGB to YCbCr converters

(32) detects the voltage value, when a low-voltage is detected, a alerting signal is sent to the head mounted display unit (38) and the signal control (I²C) of the circuit system bus.

The video processor (34) includes at least: a filter (341) that filters the digital video signals into enhanced digital video signals; a shifter (342) that processes left shift, left rotation, right shift and right rotation on the enhanced digital video signal and provides the bidirectional output of the digital video signal.

The algorithm for color saturation enhancement of the two color enhancement units (36) is described by using the formula in below:

1. The averaged sum of R, G, B values is taken as the brightness Y of that pixel.

$$Y = \frac{(R+G+B)}{3}$$

2. The maximum magnification zoom is calculated as the minimum of the magnification zoom of the three colors $$Mul = \min\left(\sqrt{\frac{255-R}{|R-Y|}}, \sqrt{\frac{255-G}{|G-Y|}}, \sqrt{\frac{255-B}{|B-Y|}}\right)$$

3. Adjust the coefficient between 0 and 1.

$$CQ=(0\sim1)$$

4. RGB converting formula $$Rnew=(1+CQ*Mul)*(R-Y)+Y$$

$$Gnew=(1+CQ*Mul)*(G-Y)+Y$$

$$Bnew=(1+CQ*Mul)*(B-Y)+Y$$

The head mounted display unit (38) includes at least: two micro-displays (381) that simultaneously receive the image signals converted by the D/A converters (37) and present to the two micro-displays (381).

The signal voltage controller (39) includes at least: a voltage detector (391) that detects the voltage value and generates reference voltage data for voltage value analysis; a bidirectional serial communication controller (392) that provides signal control bus (I²C Inter-Integrated Circuit), which is the circuit system bus; a low voltage alerter (393) that a warning signal is sent to head mounted display (38) and the circuit system upon receiving low voltage signal from voltage detector (391).

As shown in FIG. 3, the illustrative circuit diagram of the filter unit of the present invention, the analog signal model (1) and the digital signal model (3) of a head mounted low-vision aid device of the present invention both have a filter (4) to process black and white signals. The filter (4) (the number of filter is not limited) includes at least: a first low-pass filter (41) where the digital video signals parallel pass the first cutoff frequency and the part of the digital video signals that is higher than the first cutoff frequency is filtered out; a second low-pass filter (42) (the number of the low-pass filter is not limited, the cutoff frequencies of these low-pass filters, such as $3^{rd}$, $4^{th}$, etc., can be preset by program if necessary) where the original digital video signals parallel pass and the part of the digital video signals that is higher than the second cutoff frequency is filtered out; a non-linear controller (43) that compresses non-linearly the pixel grayscale value of the digital video signal passed through the first low-pass filter (41) to generate an image frame; a gain adjustment unit (44) (if more low-pass filters are required, then there will have more gain adjustment unit that other than unit (44) are required) that adjusts the digital video signal passed through the first low-pass filter (41) by deleting the multiple grayscale value of the digital video signal from the second low-pass filter (42) (or the second low-pass filter (42) by deleting the multiple grayscale value of the digital video signal from the third low-pass filter, and so on) to generate (an) image frame(s), which will be added to the image frame generated by non-linear controller (43) combined with the image frame generated from the digital video signal from the second low-pass filter less the original digital video signal in order to obtain an enhanced video.

The nonlinear compression is described in below:

Assume that F(k,f) is the function of the original image and $H_L(k,j)$ is a low pass filter.

$$F_L(n_1, n_2) = \sum_{k=n_1-N_1}^{n_1+N_1} \sum_{j=n_2-N_2}^{n_2+N_2} F(k,j) H_L(k-n_1, j-n_2) \quad (I)$$

where $F_L(n_1,n_2)$ in equation (I) is the result of the convolution of the original image and the low pass filter; $N_1 \times N_2$ is the mask size of the digital filter; (k,j) is the position of any pixel in the original image that indicates the row and column and same to the $(n_1,n_2)$ which is the new position after the mathematical operation;

$$F'_L(n_1,n_2)=(F_L(n_1,n_2)-128)*L+128 \quad (II)$$

where $0 \leq L \leq 1$ and the $F'_L(n_1,n_2)$ in equation (II) is the result of nonlinear compression for the function of $F_L(n_1,n_2)$.

Besides, the symbol Σ in FIG. 3 means adding to ("+" at the input) or subtracting from ("−" at the input) the data of two image frames, while X means the product with the Gain value to the grayscale value of each pixel on the image frame.

Although the invention has been explained in relation to its preferred embodiment, it is not used to limit the invention. It is to be understood that many other possible modifications and variations can be made by those skilled in the art without departing from the spirit and scope of the invention as hereinafter claimed.

Figure 1:
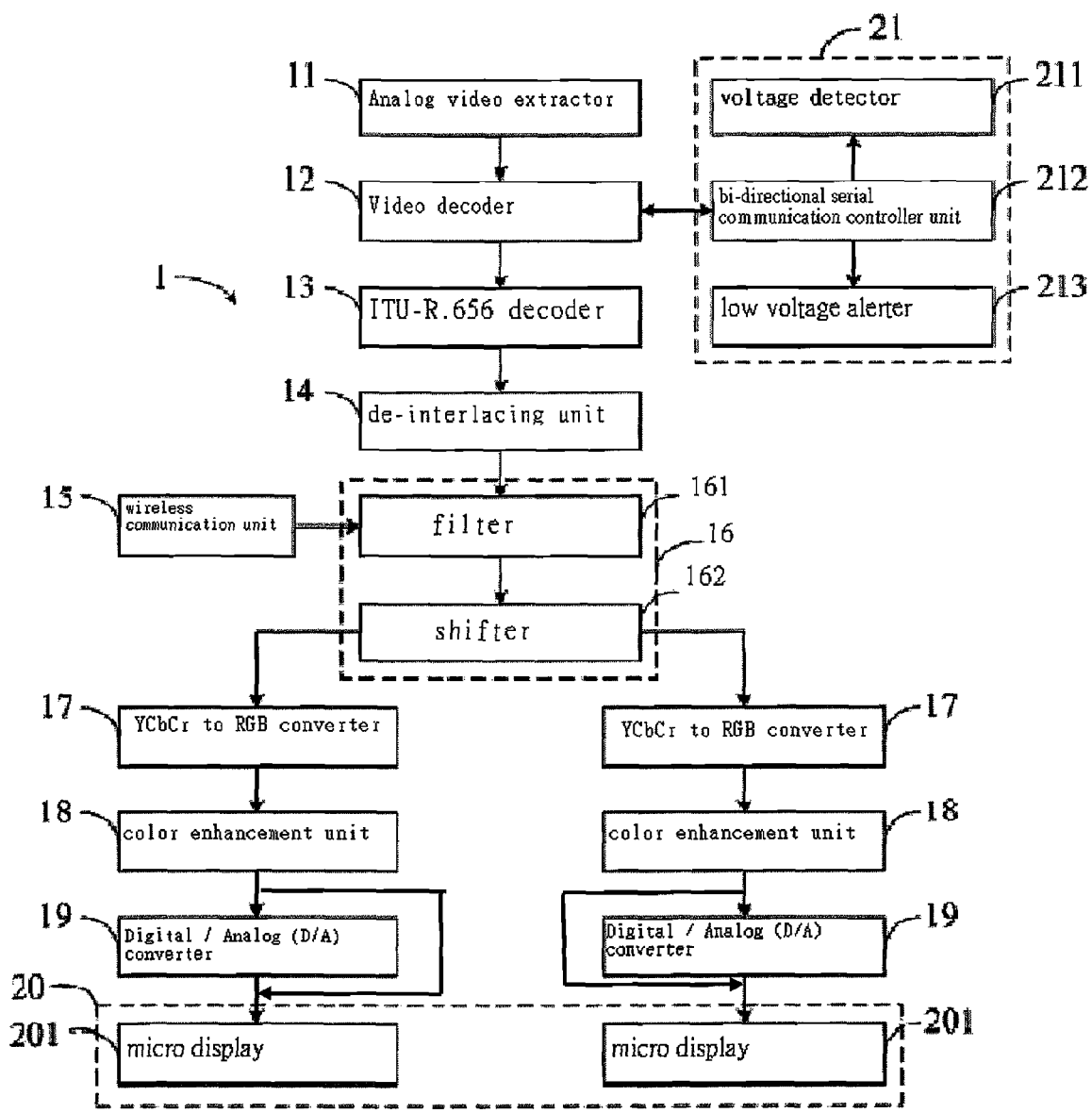
FIG. 1 is the illustrative circuit diagram of the analog signal model of the present invention of a head mounted low-vision aid device.
Figure 2:
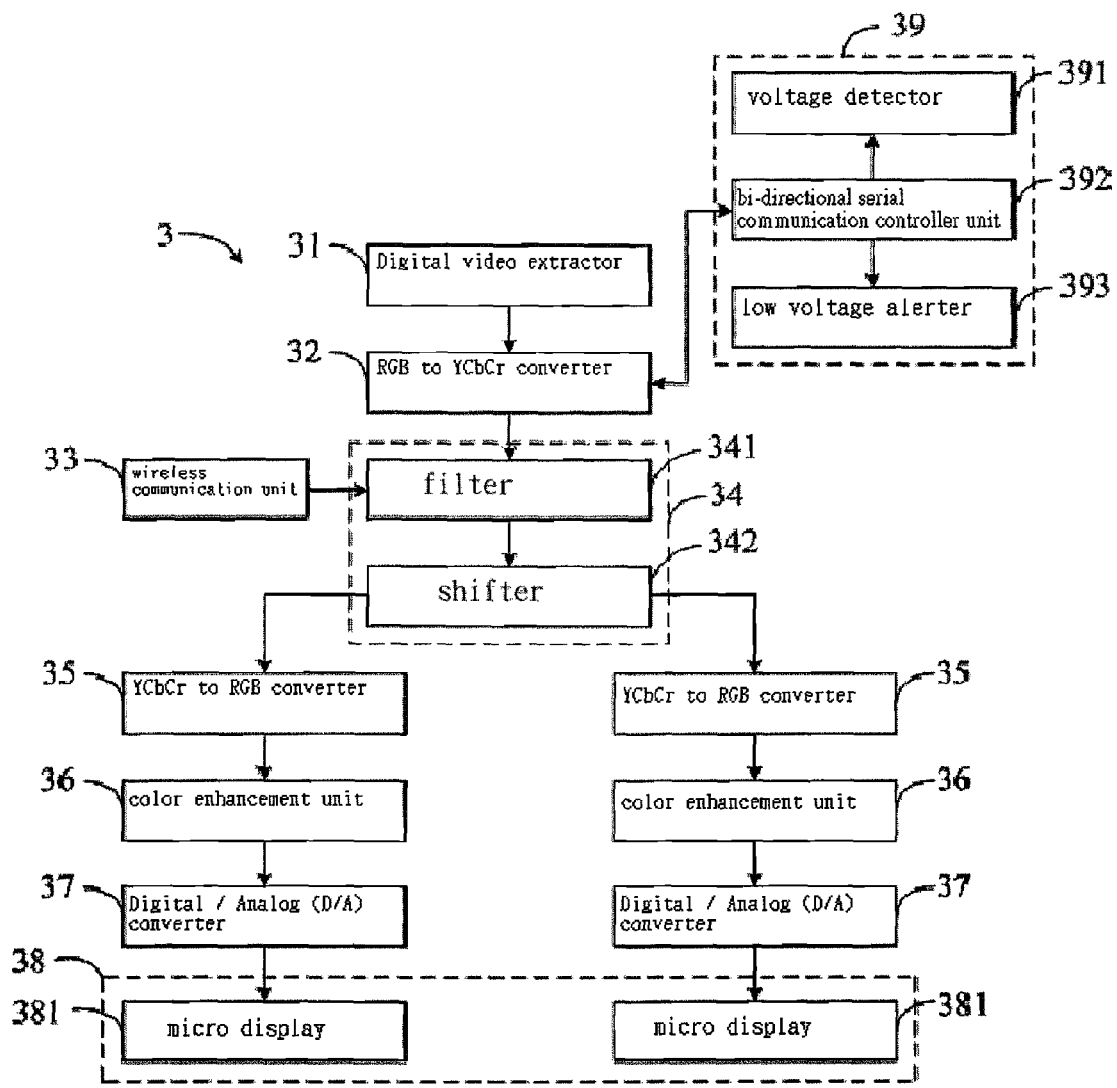
FIG. 2 is the illustrative circuit diagram of the digital signal model of the present invention of a head mounted low-vision aid device.
Figure 3:
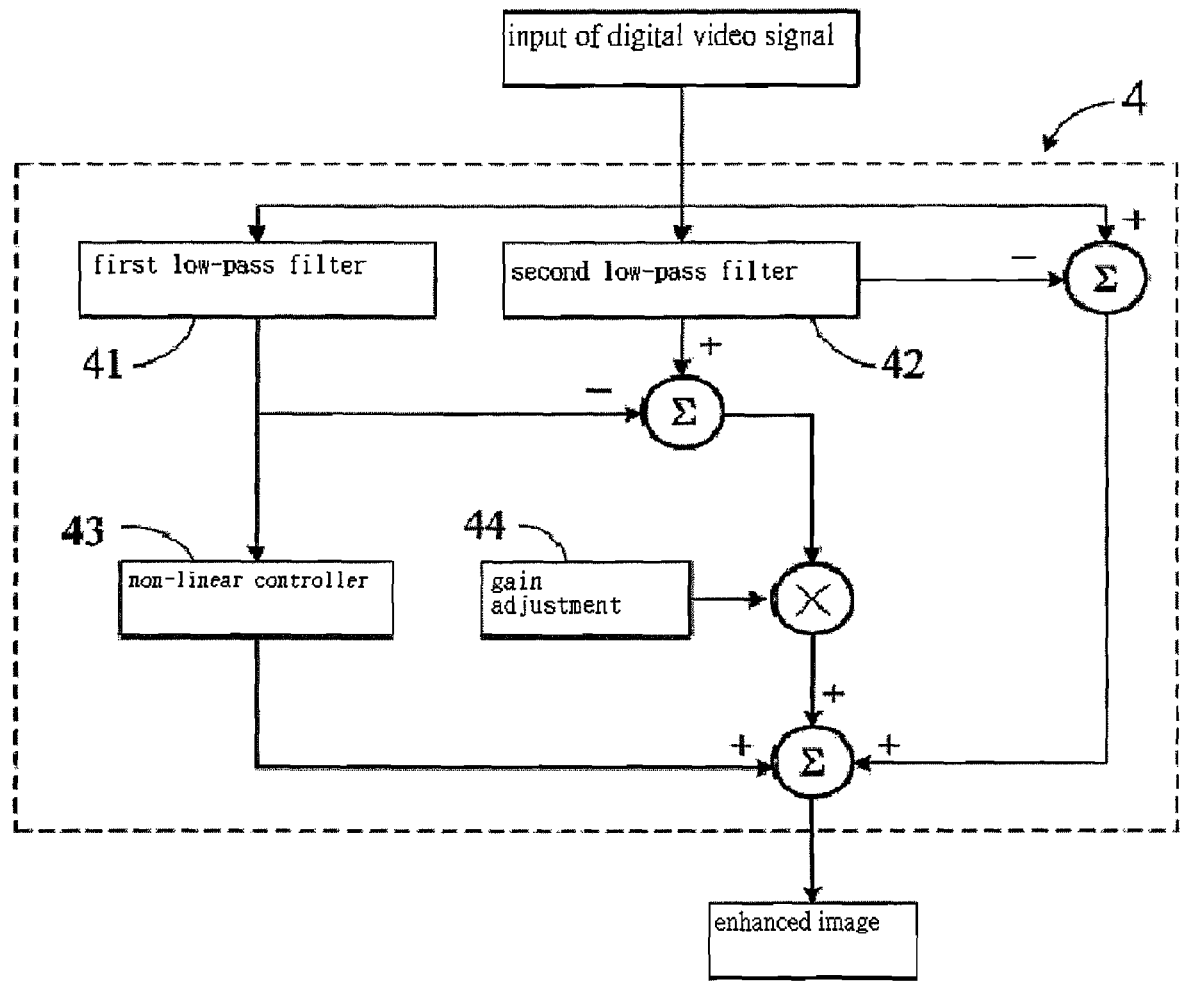
FIG. 3 is the illustrative circuit diagram of the filter of the present invention.

| Description of main components: |
| --- |
| 1 A head-mounted, analog signal model of visual display device for low-vision aid. |
| 11 Analog video extractor |
| 12 Video decoder |
| 13 ITU-R.656 decoder |
| 14 de-interlacing unit |
| 15 wireless communication unit |
| 16 video processor 161 filters 162 frame shifting and rotating unit |
| 17 YCbCr to RGB converter |

-continued

Description of main components:

18 color enhancement unit
19 Digital/Analog (D/A) converter
20 head mounted display 201 micro display
21 signal voltage controller unit
211 voltage detector 212 bi-directional serial communication controller unit 213 low voltage alerter
3 A head-mounted, digital signal model of visual display device for low-vision aid.
31 Digital video extractor
32 RGB to YCbCr converter
33 wireless communication unit
34 video processor 341 filters 342 frame shifting and rotating unit
35 YCbCr to RGB converter
36 color enhancement unit
37 Digital/Analog (D/A) converter
38 head mounted display 381 micro display
39 signal voltage controller unit
391 voltage detector 392 bi-directional serial communication controller unit 393 low voltage alerter
4 filter

What is claimed is:

1. A analog signal model of head mounted visual display device for low-vision aid, including at least:
  an analog video extractor that captures analog video signal of video data;
  a video decoder that receives the analog video signal from the video extractor and extract the analog video signal from the video;
  a ITU-R.656 decoder that receives the analog video signal extracted from the video decoder and converts the analog video signal into digital video signal;
  a de-interlacing unit that receives the digital video signal converted by the ITU-R.656 decoder and de-interlace the digital video signal so that the signal will appear in sequence;
  a wireless communication unit that provides digital signal of information on internet using wireless internet access;
  a video processor that receives the digital video signal of information on internet that is provided by the wireless communication unit and is de-interlaced by the de-interlacing unit, filters the received digital video signal into an enhanced digital video signal and then set the bidirectional output of the digital video signal;
  two YCbCr to RGB converters that simultaneously receive the two digital video signals of the bidirectional output from the video processor and convert the YCbCr signal from the two digital video signal into RGB signal;
  two color enhancement units that simultaneously receive the RGB digital video signals converted by the two YCbCr to RGB converters and enhance the color contrast of the digital signals;
  two digital/analog (D/A) converters that simultaneously receive the two color-contrast-enhanced digital video signal from the two color enhancement units and convert to digital or analog according to the display unit;
  a head mounted display unit that simultaneously receives the two analog signals converted by the two D/A converters or the digital signals and provides simultaneously the video of the two video signals;
  a signal voltage controller with bi-directional electrical connection to the video decoder provides the signal control ($I^2C$) of the circuit system bus and the detection of voltage, when a low-voltage is detected, a alerting signal is sent to the head mounted display unit and the circuit system.

2. The head mounted visual display device for low-vision aid of claim 1, wherein the video processor includes at least:
  a filter that filters the digital video signals into enhanced digital video signals;
  a shifter and rotator that processes left shift, left rotation, right shift and right rotation on the enhanced digital video signal and provides the bidirectional output of the digital video signal.

3. The head mounted visual display device for low-vision aid of claim 2, wherein filter includes at least:
  a first low-pass filter where the digital video signals parallel pass the first cutoff frequency and the part of the digital video signals that is higher than the first cutoff frequency is filtered out;
  a second low-pass filter where the original digital video signals parallel pass and the part of the digital video signals that is higher than the second cutoff frequency is filtered out;
  more filters can be added if needed;
  a non-linear controller that compresses non-linearly the pixel grayscale value of the digital video signal passed through the first low-pass filter to generate an image frame;
  a gain adjustment unit that adjusts the digital video signal passed through the first low-pass filter by deleting the multiple grayscale value of the digital video signal from the second low-pass filter to generate an image frame, which will be added to the image frame generated by non-linear controller combined with the image frame generated from the digital video signal from the second low-pass filter less the original digital video signal in order to obtain an enhanced video.

4. The head mounted visual display device for low-vision aid of claim 1, wherein the head mounted display includes at least: two micro-displays that simultaneously receive the analog image signals converted by the D/A converters or the digital signal and present to the two micro-displays.

5. The head mounted visual display device for low-vision aid of claim 1, wherein the signal voltage controller includes at least:
  a voltage detector that detects the voltage value and generates reference voltage data for voltage value analysis;
  a bidirectional serial communication controller that provides signal control ($I^2C$) of the circuit system bus;
  a low voltage alerter that a warning signal is sent to head mounted display and the circuit system upon receiving low voltage signal from voltage detector.

6. A head mounted visual display device for low-vision aid, which includes at least:
  a digital video extractor that captures digital video signal of video data;
  a RGB to YCbCr converter that receives the digital video signal captured by the video extractor and converts the RGB signal of the digital video into a YCbCr signal;
  a wireless communication unit that provides digital signal of information on internet using wireless internet access;
  a video processor that receives the digital video signal of information on internet that is provided by the wireless communication unit and the YCbCr video signal from the RGB to YCbCR converter, filters the received digital video signal into an enhanced digital video signal and then sets the bidirectional output of the digital video signal;
  two YCbCr to RGB converters that simultaneously receive the two digital video signals of the bidirectional output from the video processor and convert the YCbCr signal from the two digital video signal into RGB signal;

two color enhancement units that simultaneously receive the RGB digital video signals converted by the two YCbCr to RGB converters and enhance the color contrast of the digital signals;

two digital/analog (D/A) converters that simultaneously receive the two color-contrast-enhanced digital video signal from the two color enhancement units and convert to digital or analog if needed according to the display unit;

a head mounted display unit that simultaneously receives the two video signals converted by the two D/A converters and provides simultaneously the video of the two video signals;

a signal voltage controller with bi-directional electrical connection to the RGB to YCbCr converters provides the signal control (I²C) of the circuit system bus and the detection of voltage, when a low-voltage is detected, a alerting signal is sent to the head mounted display unit and the circuit system.

7. The head mounted visual display device for low-vision aid of claim 6, wherein the video processor includes at least:

a filter that filters the digital video signals into enhanced digital video signals;

a shifter and rotator that processes left shift, left rotation, right shift and right rotation on the enhanced digital video signal and provides the bidirectional output of the digital video signal.

8. The head mounted visual display device for low-vision aid of claim 6, wherein filter includes at least:

a first low-pass filter where the digital video signals parallel pass the first cutoff frequency and the part of the digital video signals that is higher than the first cutoff frequency is filtered out;

a second low-pass filter where the original digital video signals parallel pass and the part of the digital video signals that is higher than the second cutoff frequency is filtered out;

a non-linear controller that compresses non-linearly the pixel grayscale value of the digital video signal passed through the first low-pass filter to generate an image frame;

more filters can be added if needed;

a gain adjustment unit that adjusts the digital video signal passed through the first low-pass filter by deleting the multiple grayscale value of the digital video signal from the second low-pass filter to generate an image frame, which will be added to the image frame generated by non-linear controller combined with the image frame generated from the digital video signal from the second low-pass filter less the original digital video signal in order to obtain an enhanced video.

9. The head mounted visual display device for low-vision aid of claim 1, wherein the head mounted display includes at least: two micro-displays that simultaneously receive the image signals converted by the D/A converters and present to the two micro-displays.

10. The head mounted visual display device for low-vision aid of claim 6, wherein the signal voltage controller includes at least:

a voltage detector that detects the voltage value and generates reference voltage data for voltage value analysis;

a bidirectional serial communication controller that provides signal control (I²C) of the circuit system bus;

a low voltage alerter that a warning signal is sent to head mounted display and the circuit system upon receiving low voltage signal from voltage detector.

\* \* \* \* \*